United States Patent [19]

Niedzwiecki

[11] Patent Number: 5,896,125
[45] Date of Patent: Apr. 20, 1999

[54] CONFIGURABLE KEYBOARD TO PERSONAL COMPUTER VIDEO GAME CONTROLLER ADAPTER

[76] Inventor: Richard H. Niedzwiecki, 3170 Alexis Dr., Palo Alto, Calif. 94304

[21] Appl. No.: 08/554,611

[22] Filed: Nov. 6, 1995

[51] Int. Cl.[6] .............................. G06F 3/02; H03M 11/00
[52] U.S. Cl. .................... 345/168; 463/36; 463/37; 463/1; 345/156
[58] Field of Search ................... 345/168; 463/36, 463/37, 43; 340/407.2; 341/22, 26; 364/709.01; 395/173, 500

[56] References Cited

U.S. PATENT DOCUMENTS

| | | | |
|---|---|---|---|
| 5,551,701 | 9/1996 | Bouton et al. | 463/36 |
| 5,574,891 | 11/1996 | Hsu et al. | 345/168 X |
| 5,576,734 | 11/1996 | Daniele et al. | 345/168 |
| 5,592,609 | 1/1997 | Suzuki et al. | 395/173 |
| 5,593,350 | 1/1997 | Bouton et al. | 463/36 |

*Primary Examiner*—Raymond J. Bayerl
*Assistant Examiner*—Seth D. Vail

[57] ABSTRACT

The Adapter is coupled to a keyboard, and one or multiple video game control devices, including widely available directional game pads and joysticks designed for other video game platforms. The Adapter is in turn coupled to the keyboard port of a personal computer. During the Function mode, button presses or other input decision actions observed at the video game controller result in a key scan code being sent to the personal computer's keyboard port based on a user-defined association list. During the Program mode, the association list is reconfigured in one of three ways, two of which are achieved automatically through a reconfiguration program running on the computer. The third way of reconfiguring the Adapter involves the user manually associating one or multiple keyboard key presses to a particular button press or other input decision action at the video game controller. Keyboard key press to button press or other input decision action associations are stored in either non-volatile memory, or in volatile memory.

3 Claims, 10 Drawing Sheets

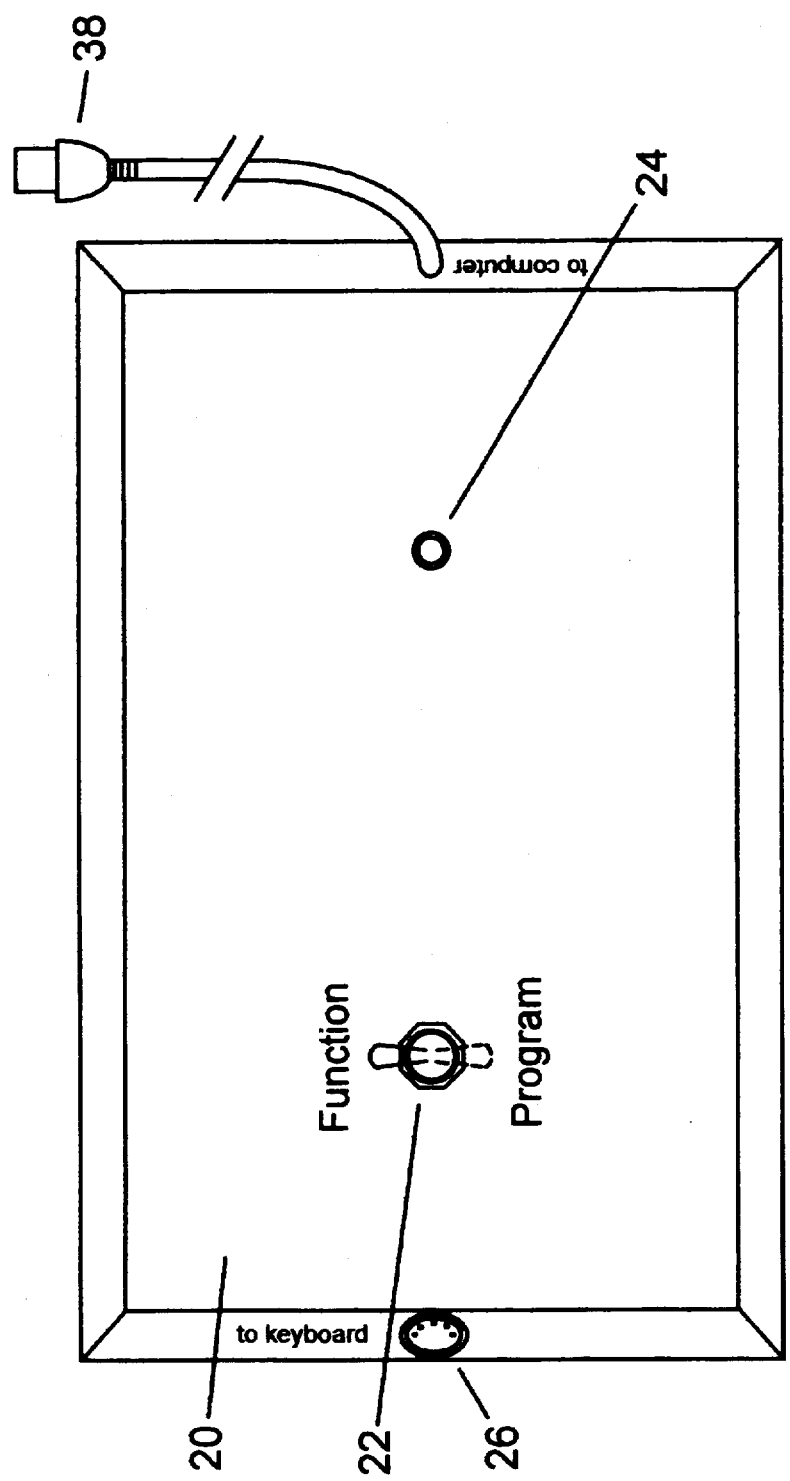

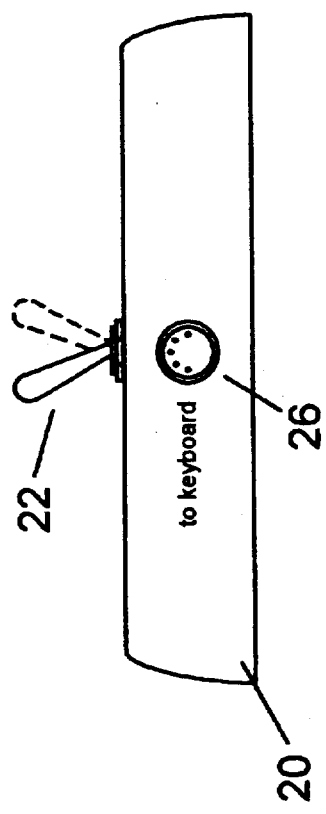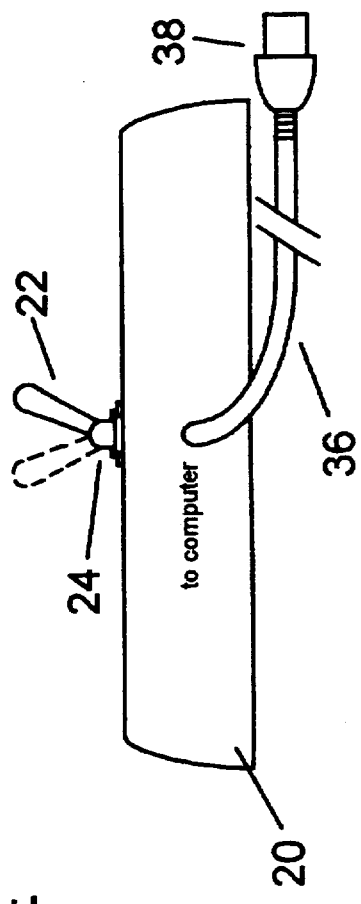
FIG. 3D
FIG. 3E

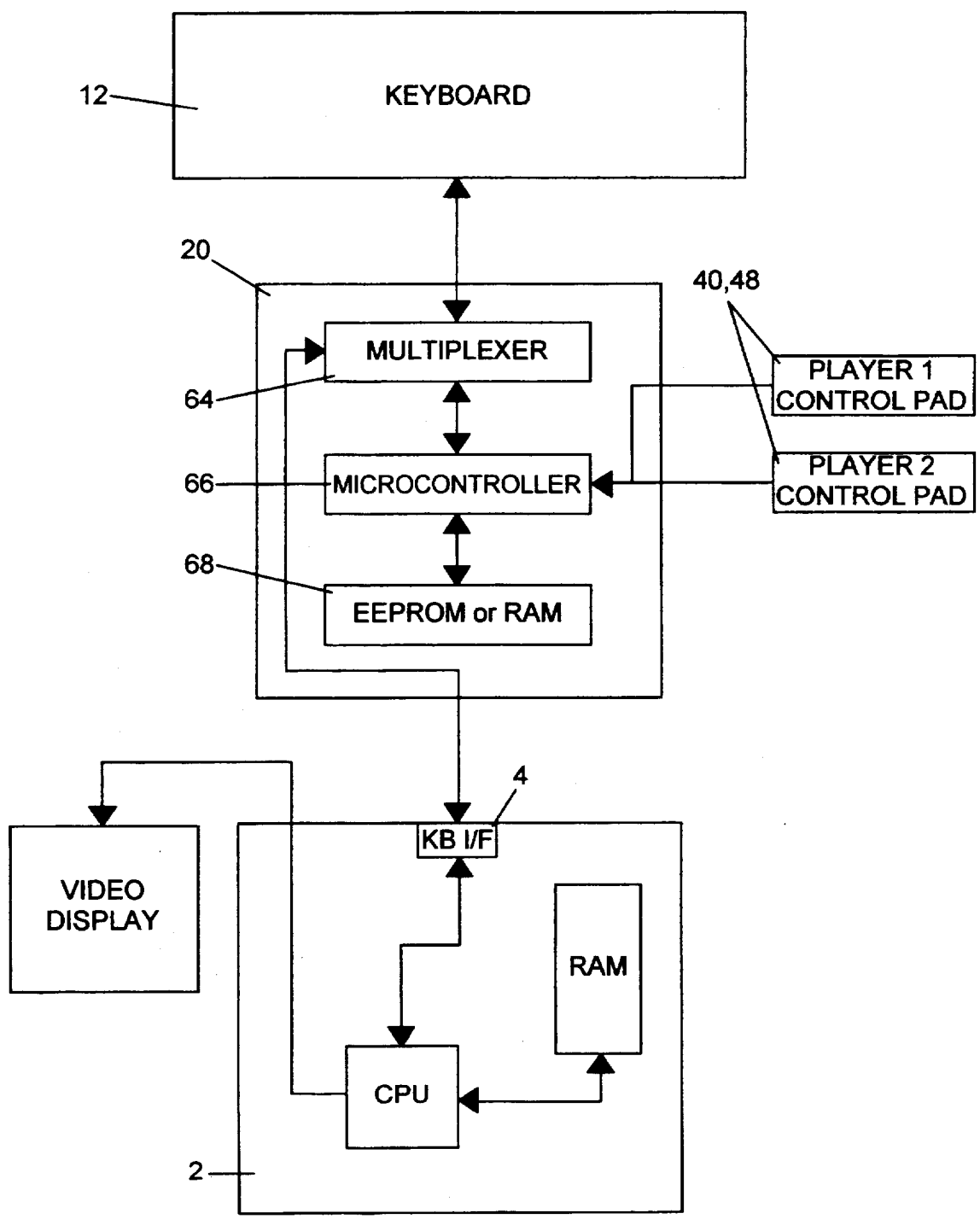

CONFIGURABLE KEYBOARD TO PERSONAL COMPUTER VIDEO GAME CONTROLLER ADAPTER

BACKGROUND

1. Field of Invention

This invention relates generally to the use of personal computers as a platform for running video game software programs, more specifically to a new device that facilitates gameplay by allowing the use of widely available, specially designed video game controllers.

2. Discussion of Prior Art

Typically, video games platforms have been classified into two distinct areas: dedicated video game platforms and personal computers configurable to run video game programs. For those dedicated type video game platforms, input from one or more game players is handled via dedicated hand-held input controllers, numbering usually one controller per player. Such hand-held controllers typically include a directional pad, commonly referred to as a d-pad, or joystick mechanism that allows the player to input a desired directional input. Also included are any number of buttons or switches that allow the player to initiate any action within the video game that has been associated with a specific button press or switch closure.

Personal computers, which have the ability to run the same or similar video game programs as do dedicated platform systems, do not typically have the same built in controller interface hardware that dedicated platforms systems have. This prevents a game controller, such as a joystick or directional pad type controller, to be used as input for one or multiple players playing a video game without specialized controller interface hardware first being installed.

There have been two widely accepted and implemented solutions that provide video game players the ability to input game playing decisions to a personal computer. These are using the computer's keyboard for input, and using a game interface card and compatible joystick or other game controller device to provide input via the computer's industry standard game port. Using the keyboard for discrete signal input has the disadvantages of being clumsy and awkward when rapid, dexterous button press input is required from the player. This fact usually excludes the keyboard from being used for anything more than typed, textual input while playing video games unless it is the only suitable means of input available. An exception to this is when a multiple player video game relegates the input responsibilities for one player to the keyboard, and another player to a joystick or other input device that sends input to the computer via the industry standard game port. The inherent disadvantages of two video game players having to compete in a non-equitable fashion are clear, and have in part prevented multiple player video games that have seen tremendous popularity on other dedicated video game platform systems, from becoming as popular on personal computer systems.

If a joystick or other video game controller that is designed to send input to a game port is used, it is usually necessary to install a game interface card into the computer to allow access to such a port. The industry standard game port that is found in IBM personal computers and compatibles is the most common game port supported. This particular game port allows a limited number of discrete signal inputs, that is four on/off binary signals, and a limited number of variable signal inputs, that is, four variable voltage signals common to potentiometer output. The game port can support input from one joystick with up to four analog signal inputs and four discrete signal inputs, or two joysticks with two analog signal inputs and two discrete signal inputs each. Only one game card can be used with this game port, and thus input via this port is limited.

As video games that require more input from the player or from multiple players become more popular, the inherent input limitations of the industry standard game port, when using a personal computer as a video game platform, has become apparent. For example, such popular fighting type video games as Mortal Kombat, Street Fighter, and others where one player competes against another player or against a computer opponent have become increasingly sophisticated in their attempts to seem more real. Players now have the option to attack the opponent in numerous ways, each attack typically being assigned to a separate button. A fighting game that allows the player to initiate three types of kicks and three types of punches would require each player to use a video game controller that accommodates six discrete signal input buttons plus four directional inputs per player. Directional inputs are usually discrete signal inputs as well. This number far exceeds the industry standard game port's maximum of two discrete signal inputs per player when using two joysticks. Two popular dedicated video game platforms, the Super Nintendo Entertainment System and the Sega Genesis, both allow each player to use a directional pad controller with up to eight discrete signal input buttons plus four directional discrete signal inputs, for a total of twelve per controller per player. Coin operated arcade versions of fighting video games such as Mortal Kombat and Street Fighter also have numerous buttons facilitating player input and use a discrete signal input system for both button press and directional input.

Attempting to remedy the deficiencies encountered when using the personal computer to play video games that require multiple input decisions from multiple players, video game programmers have typically delegated one player's input tasks to the computer's keyboard, while the second player's input is by means of a joystick or other type of controller that is attached to the industry standard game port. By only using one joystick for input via the game port, all four discrete signal inputs can be assigned to one joystick, thus increasing the number of input decision inputs available to that one player. This arrangement has the obvious shortcoming of not allowing both players to compete in an equitable manner, since one player uses a joystick and the other a keyboard. While the game port does support two joystick devices, using two joysticks, or one joystick per person, limits each joystick and thus each player to only two buttons apiece. Since there are relatively few games that have ever been programmed that require each player to use only two or fewer buttons when competing against one another, the two joystick solution has never been widely implemented. Thus, video game players and video game programmers who wish to use the personal computer for game play are limited in available player controller options. The result is that games which allow player to player competition, such as personal computer versions of Mortal Kombat and Street Fighter, are much less entertaining than arcade and dedicated video game platform versions of the same.

Prior art examples of devices that emulate video game controller interface hardware are few, yet there are many examples of devices that utilize technology that can recreate key scan codes for communications with a personal computer via the keyboard port. One such example is found as one of the components of the RECONFIGURABLE VIDEO GAME SYSTEM, U.S. Pat. No. : 5,396,267, Date of Patent:

Mar. 7, 1995. This reconfigurable video game system has the ability to send key scan codes to a personal computer via the keyboard port. Further, this system allows the user to configure a joystick or throttle controller to send specific key scan codes when specific button presses are made on any attached controller. These configurations are stored in non-volatile type memory. This prior art example, however, has no ability to communicate with any other type of non-standard type video controller designed to be used with specialized interface hardware and software. Only joysticks and other game controllers specifically designed for use with this system can be used. There is no provision in the design to use multiple identical controllers, as for use with head to head, fighting type video games.

A second relevant prior art example of technology that recreates key scan codes for communications with a personal computer via the keyboard port is the SUNCOM SFX PC JOYPAD WITH KEYBOARD EMULATION OPTION. This directional pad type video game controller device uses standard keyboard emulation technology, allowing the user to send input to the computer via the keyboard port or industry standard game port. When functioning in keyboard emulation mode, the device can be configured to send user specified key scan codes to the computer's keyboard port. These configurations are stored in non-volatile type memory. Like other keyboard emulation type video game controllers, this device lacks any special hardware that would allow it to interface and communicate with non-standard video game controllers, or other type controllers that are designed to work with other video game platform hardware. Additionally, the joypad is designed to operate alone, as a single controller. When multiple joypads are used together, or one joypad is used while the keyboard is also being used simultaneously, communications errors between the keyboard, joypad, and keyboard port can occur. This prohibits the use of two or more joypads for multiple player games where multiple controllers are required.

While the two mentioned prior art examples demonstrate the common implementation and use of keyboard emulation technology, there has yet been no such implementation which includes the additional technology required for such a device to communicate with non-standard video game controllers such as those designed for use with the Super Nintendo Entertainment System, the Sega Genesis Video Entertainment System, and others.

SUMMARY OF THE INVENTION

It is therefore the object of my invention to enable single or multiple players playing a video game on a personal computer to use for input one or multiple identical, non-standard for the personal computer, video game controllers. Each controller would enable the individual player to choose from a greater number of discrete signal input decision options than the industry standard game port can support. As an example, the Super Nintendo Entertainment System type and compatible controllers allow up to four directional inputs and eight discrete on-off button press inputs per player during game play. The Sega Genesis Video Entertainment System six button type and compatible controllers also offer multiple discrete button press input options. Both types of controllers are widely available in retail stores, and millions more are currently owned by people who have purchased such dedicated video game systems. Thus, an owner of both a personal computer system and a dedicated video game system needs only an adapter to use the controllers from the latter with the former. My invention aims to do precisely this.

It is a further object of my invention to avoid the necessity of specialized game cards or adapters necessary to direct input to the computer via the industry standard game port by instead directing all input to the computer via the computer's keyboard port. This will enable personal computers that support, but do not have installed, an industry standard game port card to still be able to use video game controllers with video game programs.

A further object of my invention is to provide a way for any type of personal computer with which it is not possible to accommodate interface hardware for video game controllers and other types of input devices, to still be able to have use of such devices. An example of such personal computers are the Apple Macintosh type and compatible computers, which do not typically support an industry standard game port. However, with the invention, a video game player is able to use the keyboard port to accept input from video game controller hardware.

My invention allows the user to make use of inexpensive, high quality, specially designed, and widely available video game controller hardware for game play on a personal computer. Typically, these type of controllers require a compatible hardware interface that is an integrated part of the video game platform's hardware. Therefore, a video game controller that is made for use on such dedicated hardware platforms would not be compatible in any way with a video game platform that does not have such interface hardware attached or built-in. In order that a video game player who is using a personal computer as a video game platform can use such video game controllers as a means of input when playing video games, a specialized interface must be used such that input retrieved from the video game controller can be translated into a meaningful form of data that can used as input directed to the computer via the keyboard port. My invention attempts to serve this purpose.

Another advantage of my invention is to allow two or more video game players who are playing a competitive fighting or other type of video game, to play against one another in an equitable and unrestricted manner using like video game controllers.

A further advantage of my invention is that the invention's ability to be reconfigured to send any key scan code or combination of key scan codes, thus allowing for almost universal compatibility will all video game programs that can be configured to accept player input from the keyboard.

Further objects and advantages of my invention will become apparent from a consideration of the drawings and ensuing description.

DESCRIPTION OF DRAWINGS

FIG. 2 shows two different examples of popular video game controllers that may be used. The controllers shown are a Super Nintendo Entertainment System type and a Sega Genesis type directional pad video game controller.

FIGS. 3A–3E are an enlarged detail perspective views of the invention illustrating input/output connectors, switches, and light emitting diodes that are located at various points on the invention.

FIG. 5 is a simplified block diagram of the invention's electronics and the electronics of a typical personal computer system.

DETAILED DESCRIPTION OF INVENTION

Figure 1:
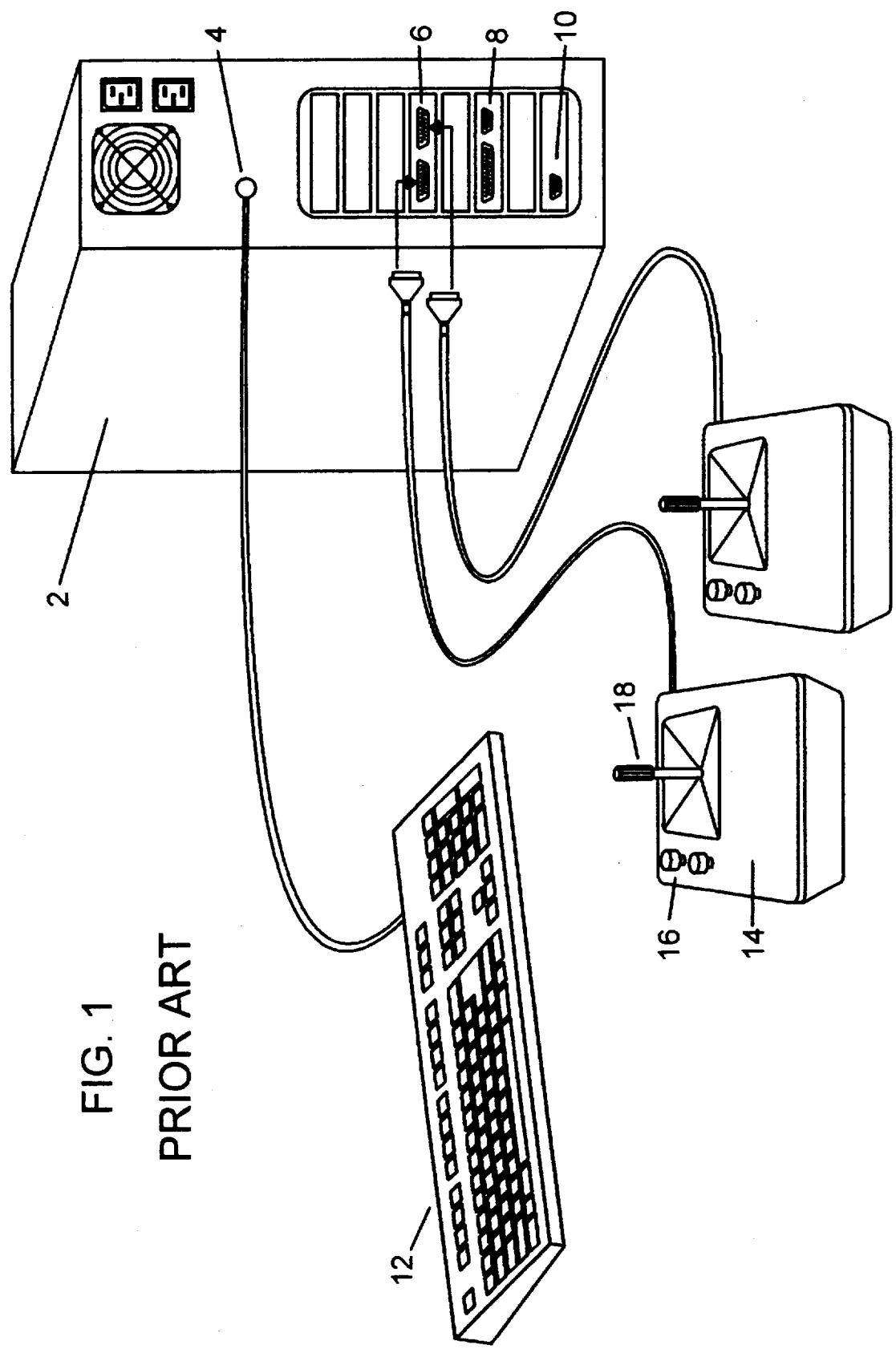
FIG. 1 is a perspective view of a typical personal computer video game system, including a personal computer and peripherals allowing the use of two typical examples of a joystick to be used as input via the industry standard game port.

FIG. 1 shows a typical personal computer based video game system, that is comprised of a computer case unit 2 housing the computer's CPU and motherboard. Other peripherals relating to the computers usual operation in any capacity are the keyboard port 4 which allows the computer to be attached to and communicate with an external keyboard 12. A serial and parallel port 8 is also typical of such a computer system, and allow for communications with peripherals (not shown), as is a video output port 10 to connect to a video display (not shown).

Primarily for use with video game type programs, a game port interface card 6 has been installed in the computer to accommodate one or two such control devices as the two joysticks 14 shown. Each joystick utilizes two discrete signal switch buttons 16 and a variable two signal input joystick mechanism 18. In other typical configurations, a game board may have only one external connector rather than two, accepting two input device connections to the game port through the use of a special connector.

Figure 2:
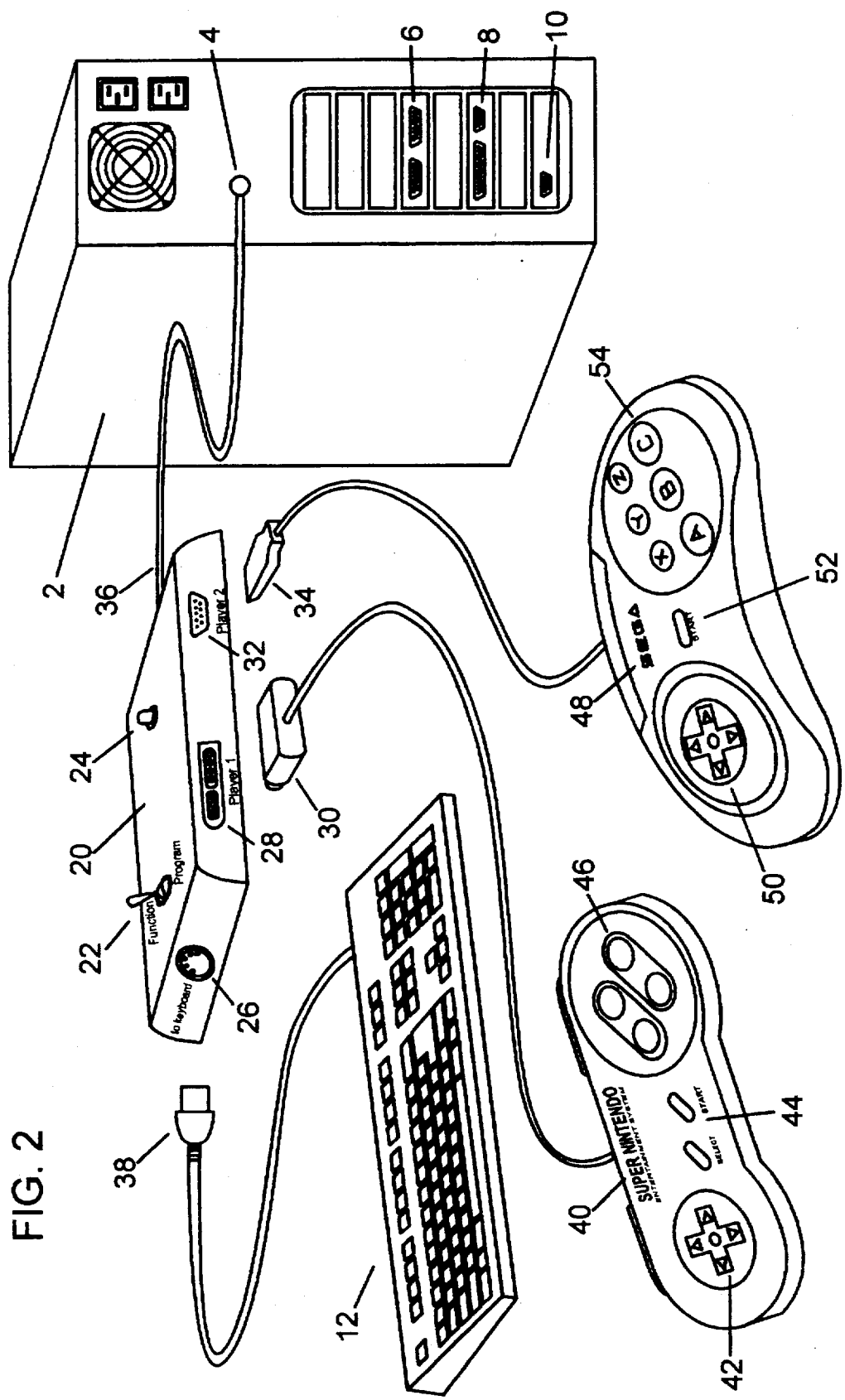
FIG. 2 is a perspective view of a typical personal computer video game system as in FIG. 1, that utilizes the invention described to allow the use of two directional pad controllers, normally incompatible with the personal computer, in place of the two standard joysticks controllers. The invention is designed to use two identical video game controllers. For demonstration purposes only.
Figure 3B:
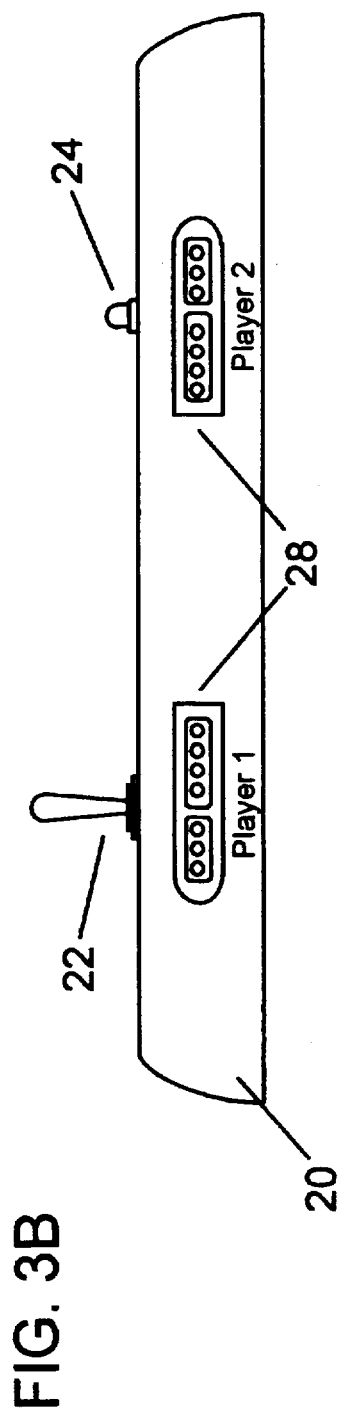
Figure 3C:
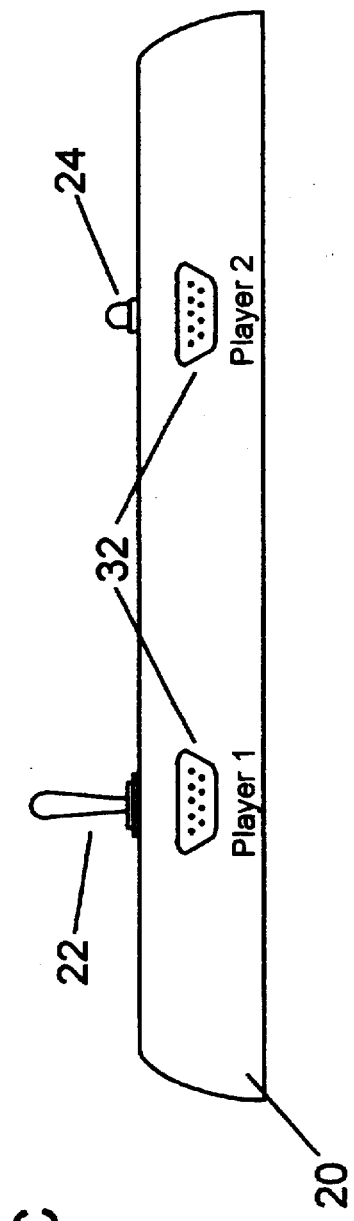

FIG. 2 shows a typical personal computer based video game system as in FIG. 1 except that the invention 20 is used to allow the use of non-standard for the personal computer video game controllers 40 and 48 for input by the video game player. The invention operates in-line between the keyboard 12 and the personal computer 2. The keyboard connector 38 that normally is plugged into the keyboard port 4 is instead plugged into the appropriate keyboard attachment receptacle 26 on one side of the invention. A second keyboard type cable 36 extends from the invention and is then plugged into the computer's keyboard port 4. One or multiple directional pad type or other non-standard type controllers 40 and 48 are plugged into the invention, allowing game player input via these devices.

Two examples of non-standard video game controllers are shown. The first is one that is designed for use with the Super Nintendo Entertainment System. This type of video game controller 40 incorporates a directional pad 42, two start/select buttons 44, six game play buttons 46 on the face and top edge of the controller.

The second example of a non-standard controller used with the invention is one that is typically used with the Sega Genesis Video Entertainment System. This type of controller 48 incorporates a directional pad 50, one start button 52, and seven game play buttons 54 on the face and top edge (top edge button not shown) of the controller.

Both types of controller 40 and 48 are connected to the invention by means of a controller connector 30 and 34 and an invention side controller connector 28 and 32. Such connectors 28, 30 and 32, 34 are unique to the type of controller the invention is designed to operate with.

FIGS. 3A–3E are three perspective views of the top, front, left, and right sides of the invention. There are two views of the front side illustrating two possible embodiments of the invention that accommodate two different types of controller.

Located on the top of the invention 20 is a function-program mode switch 22 which allows the invention to operate in either of two modes. While the invention is in use, a LED indicator light 24 will illuminate at various stages of operation. A keyboard attachment receptacle 26 is located on one side of the invention allowing a typical personal computer keyboard to be attached to the invention. On another side of the invention is located a second keyboard type cable 36 that attaches to the computer's keyboard port via a keyboard port connector 38.

On the front side of the invention is located two examples of popular video game controller connectors 28 and 32. This allows a video game controller to be attached to the invention during operation. Such game controller connectors are unique to the type of controller the invention is designed to operate with.

Figure 4A:
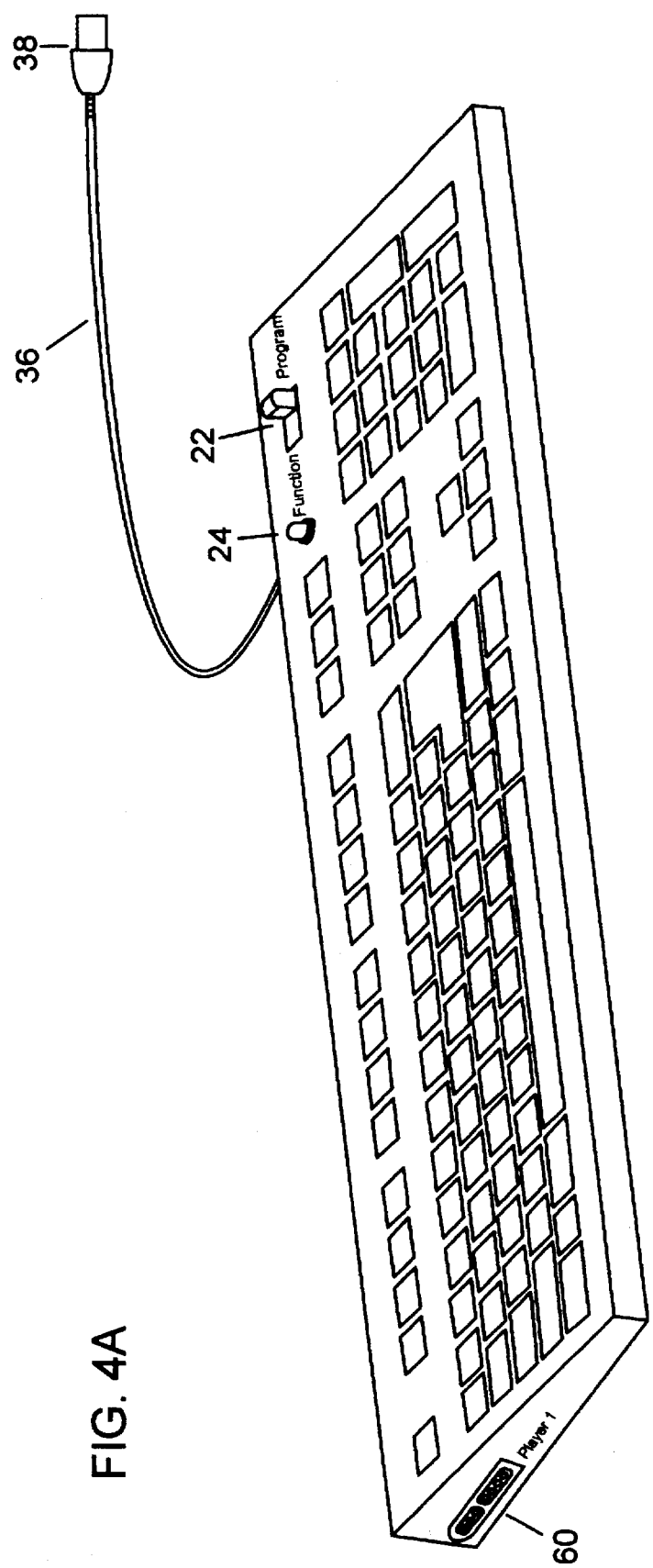
FIGS. 4A and 4B are perspective views of two implementations of the invention where the invention is built into and integrated with a conventional keyboard.
Figure 4B:
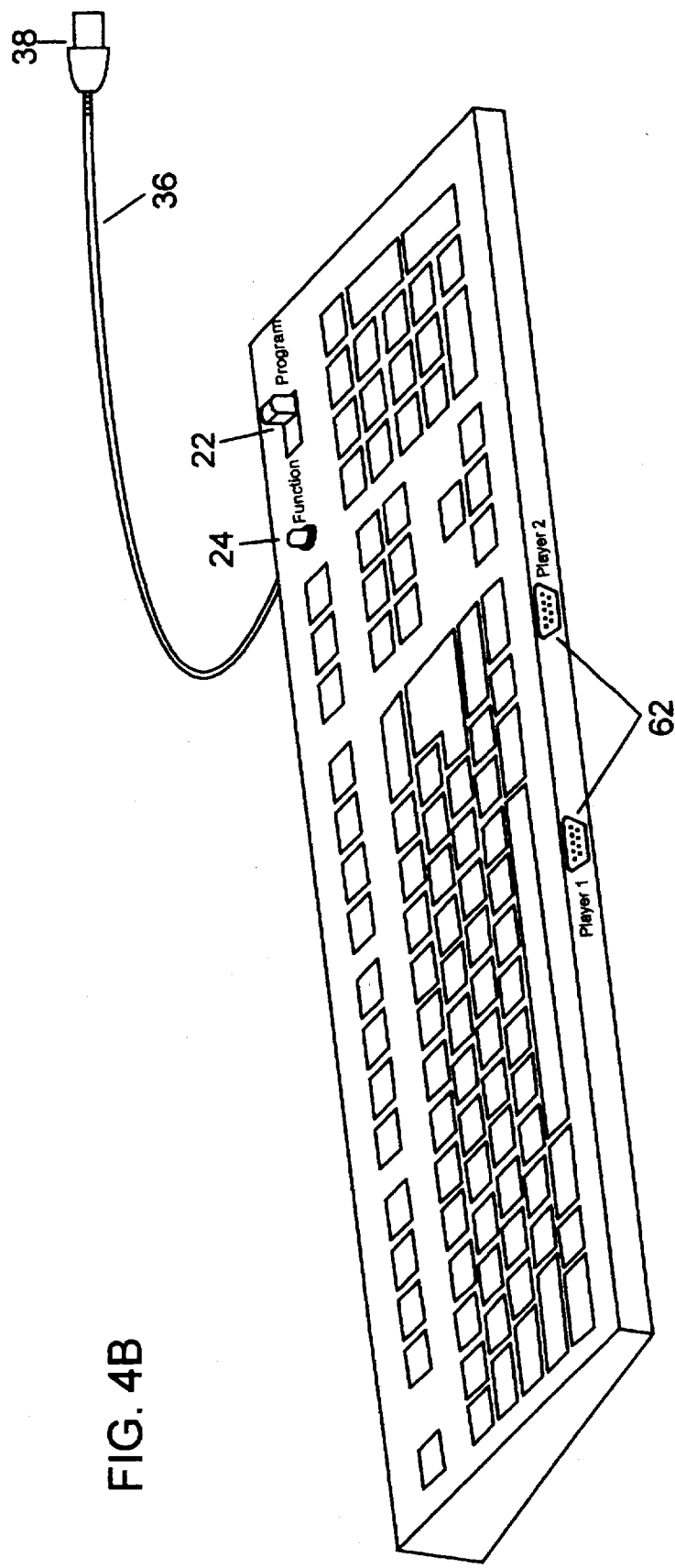

FIGS. 4A and 4B are alternative implementations of the invention's design where the invention is integrated into a conventional keyboard. The video game controller connectors can be mounted in a keyboard so that they are located at either end of a keyboard 60 or so they are located along the front edge of the keyboard 62.

In either implementation, the invention's function-program switch 22 and LED indicator light 24 is located on the keyboard's face, in an easily accessible location. Only one keyboard cable 36 from the keyboard is necessary, which plugs directly into the personal computer's keyboard port.

FIG. 5 is a diagram of the basic circuitry required to coordinate and translate all of the input and reconfiguration activity In the preferred embodiment, a microcontroller 66 samples input from one or multiple game controllers 40 and 48. The manner in which input is sampled from the attached controllers is unique to the particular type of controller that is being used. The microcontroller 66 can be easily programmed to emulate the multiplex serial communications protocol that a particular type of controller uses. Input information is processed with other information stored in a separate memory storage device 68. The result of this processing is one or multiple key scan codes that are sent to the computer via the keyboard interface port 4. When there is input from the keyboard to the keyboard port or from the keyboard port to the keyboard, the invention will pass along the key scan code or other information by means of a digital multiplexer 64.

Figure 6:
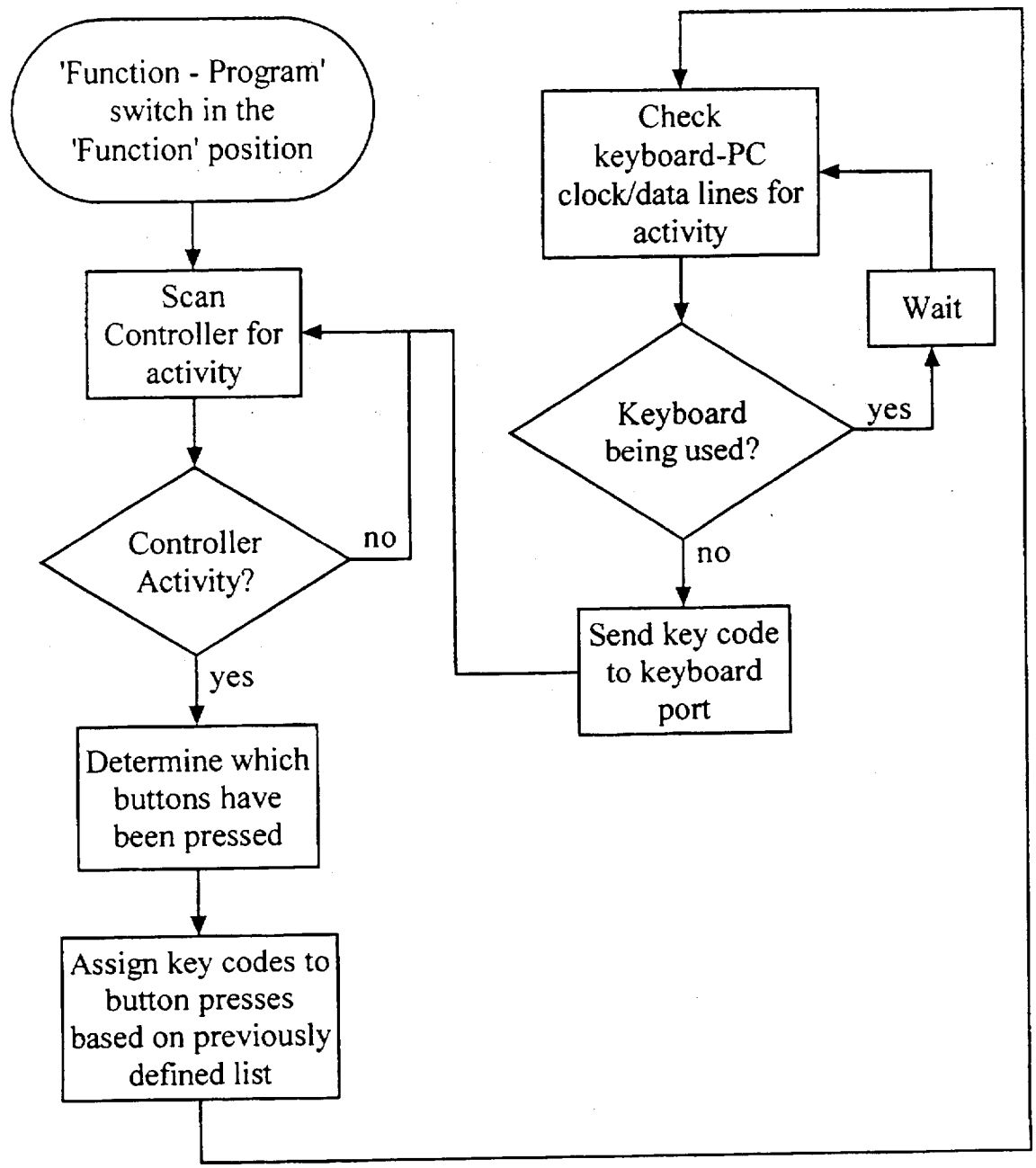
FIG. 6 is a flow diagram of the basic decision making logic that the invention's programming follows while operating in Function Mode.

FIG. 6 is a flow diagram of one possible example of decision making logic that the invention may utilize when operating in Function Mode.

Figure 7:
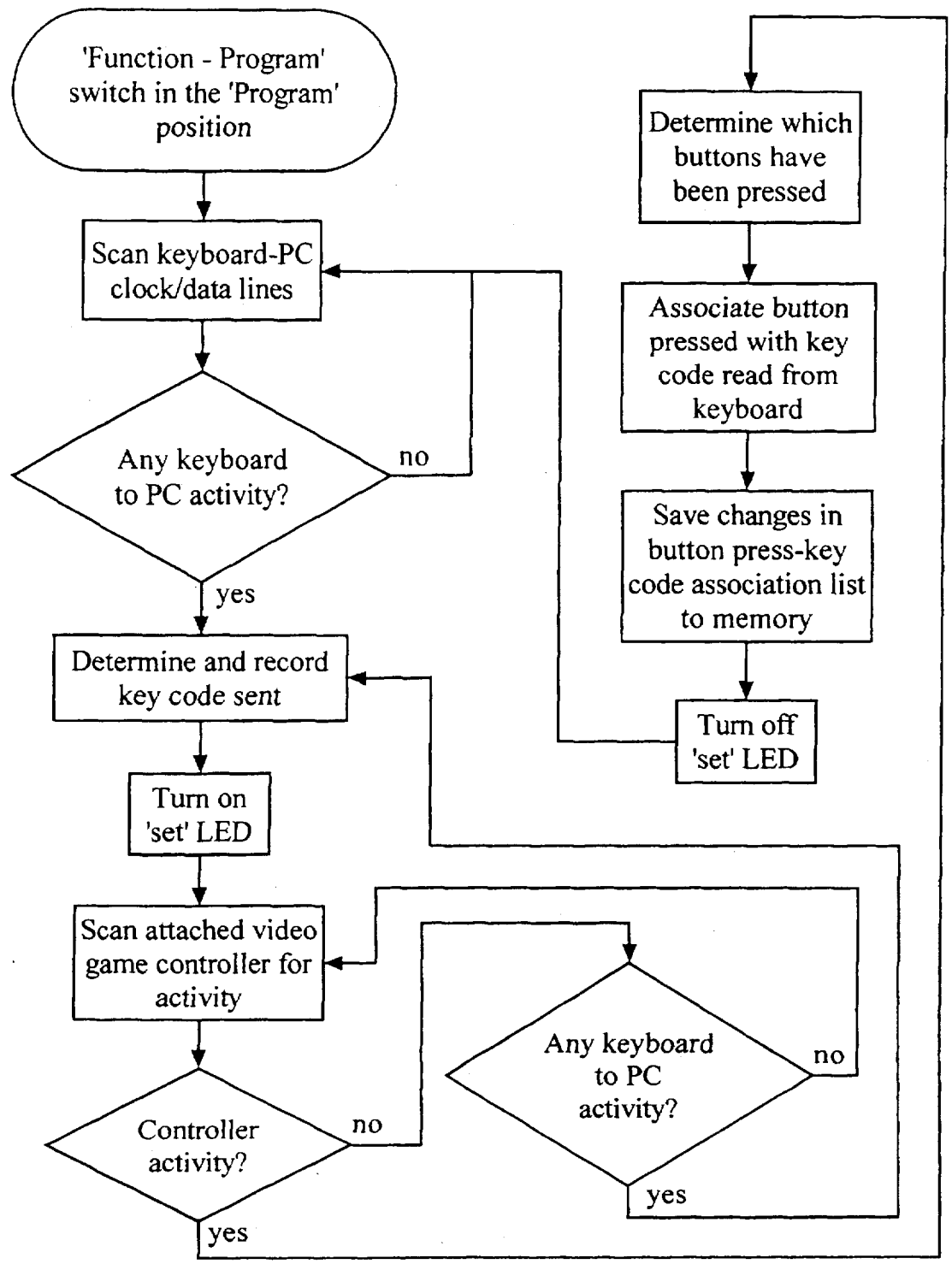
FIG. 7 is a flow diagram of the basic decision making logic that the invention's programming follows during manual reconfiguration while operating in Program Mode.

FIG. 7 is a flow diagram of one possible example of decision making logic that the invention may utilize during manual reconfiguration when operating in Program Mode.

OPERATION OF INVENTION

When the video game player is using such video game controllers 40 and 48 that are made for and used by such dedicated video game platform systems as the Super Nintendo Entertainment System and the Sega Genesis, the controller will be plugged into the invention 20, and the invention will be plugged into the computer's keyboard port 4. Additionally, there will be a keyboard port attachment receptacle 26 on the invention allowing a typical keyboard 12 to be plugged into the invention for normal keyboard input. This arrangement will allow video game controller button press and directional movement information to be directed to the invention, where upon receipt, the invention will determine which keyboard scan codes are to be associated with which button presses based on a predetermined key scan code to button press association list. The appropriate key scan code or codes are then sent to the computer's keyboard port.

Nearly all directional pad type video game controllers use a common multiplexing type of serial communications. This technique of transmitting data between the video game controller and the video game platform allows the use of fewer wires to send data from multiple discrete signal switches than would be possible if each switch was wired individually. This technique of multiplex communications is not new, and most types of video game controllers that use this technique have only subtle differences in how data is actually sent back and forth. Differences in timing and the way data is multiplexed between devices are often similar enough that game controllers can be designed with the ability to communicate using any one of several different multiplex serial communication methods. Many replacement and specialty game controllers available from third-party manufacturers offer dual platform compatibility and use a controller cable ending with two connectors that are each compatible with different platform systems. These dual-compatible controllers allow the use of one game controller on two different systems. The design of this invention can be customized to match the individual timing and method of multiplex communications that a particular type or brand of controller may use. In this way, the invention can be easily customized to operate with any new multiplex communications based video game controller that becomes available and is designed for use with other video game platform hardware.

The invention will operate at any one time in one of two modes, Function Mode or Program Mode. The selection of which mode the invention is operating in is determined either automatically by reconfiguration software running on the computer 2, or by means of a Function-Program switch 22 located in an easily accessible location on the invention.

Function Mode allows the invention to operate as described, allowing input data generated by individual video game controllers to be translated into key scan codes compatible with the particular personal computer system that the invention is being used with. These key scan codes are sent to the computer via the computer's keyboard port. Beginning with the Function-Program switch in the Function position or by automatic mode selection by the reconfiguration software, the invention scans for activity from one or a multiple of attached controllers 40 and 48. If there is no activity observed, then the invention continues to scan for such activity. In the event that there is controller activity observed, the invention determines which buttons have been pressed. From a previously determined list of button press to key scan code associations, the key scan code or codes that are associated with the observed button presses are designated to be sent to the computer. Before sending such key scan code, the invention first checks for any activity between the keyboard and the computer. If there is activity, the invention will wait a predetermined time before checking again, thus allowing time for any activity to be completed.

Then, when there is observed no further keyboard to computer activity, the invention sends the appropriate key scan code or codes to the computer keyboard port 4.

Program Mode allows the user to specify which key scan code or combination of codes are sent to the computer when a particular button is pressed or other input decision action is made on a particular controller. The invention can be made to accept reconfiguration information when in Program Mode in one of three ways. The procedure through which the invention will accept reconfiguration information is different for each method of reconfiguration.

The first way to reconfigure the invention in Program Mode is by means of a manual configuration procedure. Initially, the invention scans for activity between the keyboard 12 and the computer 4. If there is no activity observed, then the invention continues to scan for such activity. In the event that a key on the keyboard is depressed, the invention determines which key has been pressed. Then, the set L.E.D. 24 is lit to indicate that a key press has been recorded from the keyboard. The invention then scans for activity from one or a multiple of attached controllers 40 and 48. If no immediate game controller activity observed, the invention scans for keyboard activity once again. This cycle is repeated until either a key is pressed on the keyboard, or until a button is pressed on a game controller. In the event that additional keyboard key presses take place after the initial key press, additional key scan codes for the key presses are also associated with the same button press. Having multiple key scan codes sent by only one button press may be thought of as a 'macro' effect.

When controller activity is finally observed, a determination is made as to which specific button on which specific controller has been pressed. From that point on, or until that particular game controller button or input decision is assigned differently, such button press will be associated with the previously recorded key scan codes. This association will be held in non-volatile memory 68 as part of a button press-key scan code association list.

The last step in assigning a button press to a key scan code is turning off the set L.E.D. 24 and beginning to scan the keyboard to computer clock and data lines for activity, essentially starting the cycle over. This process can be repeated until all buttons or other input decisions on the video game controller have been assigned a key scan code to send upon that button or input decision's actuation. In this first way of reconfiguring the invention, the user will determine either Function Mode or Program Mode by means of a switch 22 located on the invention that will allow the user to choose a mode based on the position of the switch.

The second and third way to reconfigure the invention will be through the use of a reconfiguration program that will run on the computer with which the invention is used. However, the second and third way to reconfigure the invention will differ in the way each transmits reconfiguration data to the invention. In the second way, the invention receives reconfiguration input from an industry standard serial type port or industry standard parallel type port. In the third way, the invention receives reconfiguration input via the keyboard port where such port is of the bi-directional data transfer type. Both the second and third type will utilize a Program Mode reconfiguration program that will run on the computer with which the invention operates, and will allow the user to manually assign key scan codes to various game controller button presses, or to have all reconfiguration done automatically according to a pre-defined list of key scan codes to game controller button press associations.

Additionally, video game or other software programs running on the computer may supply reconfiguration information to the reconfiguration program, or have the reconfiguration program itself integrated as part of the video game or other software program. In the second and third types of reconfiguration, whether the invention is operating in Function Mode or Program Mode will be determined automatically by the reconfiguration program.

While functioning in either of the three types of Program Mode, in a design configuration of the invention where reconfiguration data is saved to be reused after the computer has been turned off and the flow of power to the invention has been interrupted, reconfiguration data is stored in one of two ways. The first way is by means of non-volatile memory which is contained within the invention. Since this type of memory does not require a steady source of power to maintain data holding capability, reconfiguration data will not be lost after the computer has been turned off and the flow of power to the invention has been interrupted. The second way in which reconfiguration data may be stored is by means of volatile memory which is contained within the invention. This type of memory requires a continuous source of power to maintain any stored reconfiguration data, and thus is accommodated by a widely available, common size small voltage battery that is located in the invention and is replaceable by the user. In such a design configuration where volatile memory is utilized and there is not available a continuous source of power to sustain such memory, reconfiguration data can be stored with the reconfiguration program on a floppy or hard disk drive and, at the users choosing, can be reloaded into the invention's volatile memory at any time that the computer system is operational and the invention is receiving power.

Accordingly, the reader will see that the Configurable Keyboard to Personal Computer Video Game Controller Adapter has the potential to enhance the personal computer's ability to perform as a video game platform. As personal computers become more and more powerful in their processing power, they stand out as the most capable platform for running complex video game programs that require massive numbers of mathematical calculations in a very short time. Such dedicated video game platforms as the Super Nintendo Entertainment System and the Sega Genesis use older technology that makes them ill-equipped to take on such challenges. Newer dedicated video game platforms such as the Atari Jaguar, 3DO Multiplayer, the Sega Saturn, and the Sony Playstation have the necessary technology to run complex software programs, but their high retail price and limited use for other purposes makes them a less popular investment than would a personal computer. Ideally, the typical personal computer, with it's vast computing power and versatility, should stand out as the best choice for work and play. Yet, the personal computer is currently limited by one key element that prevents it from being a truly capable video game platform. That shortcoming is the lack of good player game control devices. The Configurable Keyboard to Personal Computer Video Game Controller Adapter finally brings the element of good game control to the personal computer video game platform.

There are widely available controllers for such dedicated video game platforms as the Super Nintendo Entertainment System, Sega Genesis, Atari Jaguar, 3DO Multiplayer, Sega Saturn, and the Sony Playstation. These controllers, which can be purchased in most consumer electronics stores, computer stores, and department stores, and are priced economically due in part to the large numbers of manufacturers of clone styles. Also, these controllers come is a variety of sizes and styles, ranging from small hand held directional pad types, to larger models with arcade joystick and button mechanisms. With many features, such as repeating button press mode or turbo mode, and wireless designs that allow gameplay from across the room, the owner of a dedicated video game platform has an almost infinite number of video game controller options to choose from. This invention allows the personal computer owner to have the same video game controller options that dedicated video game platform owners have had for years, and at the same reasonable low prices that one finds for such hardware. Additionally, the personal computer owner who also owns a dedicated video game platform system which uses specialized game controllers needs only purchase the invention to allow the use of such controllers with that personal computer.

Although the description above contains many specificities, these should not be construed as limiting the scope of the invention, but merely providing illustrations of some of the presently preferred embodiments of this invention. For example, the invention can easily be designed to communicate with other types of widely available controllers not listed above; the invention can be integrated into other hardware and peripheral devices in addition to the keyboard, motherboard, etc. Also, the invention may use a number of different types of decision making logic when operating in various modes, and the decision making logic illustrated in FIG. 5 and FIG. 6 should not be viewed as the only type.

Thus the scope of the invention should be determined by the appended claims and their legal equivalents, rather than by the examples given.

I claim:

1. A configurable keyboard to personal computer video game controller adapter, where such adapter is attached and sends output to a personal computer having a microprocessor operable under the control of a software program, the computer having a keyboard interface port, a display coupled to the personal computer for displaying images produced by the programs, and a computer keyboard, the adapter further comprising:

a means for attaching one or multiple, similar type video game controllers to the adapter for the purpose of transmitting from such controllers, to the adapter, actuation signal data corresponding to controller input decisions;

a means for coupling a computer keyboard to the adapter for the purpose of transmitting key scan codes to the adapter, a means for coupling the adapter to a computer for the purpose of transmitting key scan codes to the computer's keyboard port;

a means within the adapter for transmitting key scan codes to the computer;

a means within the adapter for receiving key scan codes from the computer, a means within the adapter for transmitting key scan codes to the keyboard;

a means within the adapter for receiving key scan codes from the keyboard;

a method of transmitting key scan codes to the computer during a functional mode responsive to the actuation of input devices attached to the adapter.

2. A technology within the adapter to emulate the method of multiplex communications used by dedicated video game platform type video game controllers, that technology comprising:

a means within the adapter to generate variable voltage signal output common to serial multiplex communications;

a means within the adapter to receive variable voltage signal input common to serial multiplex communications;

a microcontroller running a reconfigurable video game controller interface hardware emulation program.

3. A method of reconfiguring the adapter comprising:

a means within the adapter allowing the operator to select manually, or automatically through the use of a reconfiguration program running on a personal computer according to claim 1, either a functional or reconfiguration mode;

a means within the adapter for reconfiguring the adapter responsive to receiving reconfiguration key scan codes such that the adapter transmits a reconfiguration key scan code to an attached personal computer as in claim 1 when a corresponding input device is actuated;

a reconfiguration software program running on a personal computer according to claim 1 for the purpose of storing and transmitting to the adapter reconfiguration data;

downloading the reconfiguration key scan codes from a personal computer according to claim 1 to the adapter;

uploading the reconfiguration key scan codes from the adapter to a personal computer according to claim 1;

a memory within the adapter for storing the reconfiguration key scan code association data.

* * * * *